INVENTORS
RAYMOND H. HOSKINS
BERNARD H. SOFFER

BY Elliott & Pastoriza
ATTORNEYS

United States Patent Office 3,496,482
Patented Feb. 17, 1970

3,496,482
SOLID STATE LASER DEVICE USING YTTRIUM OXIDE AS THE HOST MATERIAL
Raymond H. Hoskins, San Pedro, and Bernard H. Soffer, Northridge, Calif., assignors to Union Carbide Corporation, a corporation of New York
Filed Dec. 31, 1963, Ser. No. 334,846
Int. Cl. H01s 3/00
U.S. Cl. 331—94.5                                6 Claims

ABSTRACT OF THE DISCLOSURE

This disclosure relates to a solid state laser in which the host crystal constitutes yttrium oxide and the active ion constitutes neodymium, the atom percent of neodymium ranging from .01 to 10%.

---

This invention relates generally to laser devices and more particularly to an improved solid state laser device using yttrium oxide as the host crystal.

Solid state materials for effecting light amplification by the stimulated emission of radiation, from which the term "laser" is derived, are now well known in the art. These devices include a host crystal; for example alpha alumina ($\alpha$-$Al_2O_3$), doped with a primary additive to provide the laser ions; for example, chromium. The stimulated emission of radiation is effected by pumping optical energy into the crystal to provide an inverted population between two energy levels of the laser ions. Regenerative means in the form of end coatings of high reflectance or alternatively end mirrors or semi-transparent surfaces adjacent the opposite ends of the crystal, are provided to stimulate the coherent emission of monochromatic light of a wave length and frequency corresponding to the energy difference between the predetermined energy levels. The emitted light may be coupled out of the system through a small opening in one of the end reflectors or through one of the end reflectors when only a partially reflecting surface is provided.

Many of the solid state host materials in which laser action has been realized require complicated, delicate, and expensive auxiliary equipment. For example, the energy levels of the laser ion and the fluorescent life time of the device may be such that extremely stringent requirements are placed on the optical pumping system in order to realize useful laser action. Thus, peak power loads on the optical pumping system to effect the desired population inversion are often of such magnitude as to "burn out" the pumping light source relatively quickly. In other instances, cooling systems of an elaborate nature are required.

In addition to the foregoing, the physical properties of the crystal host material itself may be such that thermal cracking or destruction of the crystal occurs under intense light pumping. For example, if the lattice structure is asymmetrical or non-isotropic resulting in different thermal coefficients of expansion and conductivity in different directions, extreme care must be taken in the treatment and handling of the crystal. Crystalline anisotropy may also result in different optical refraction and absorption coefficients. In such crystals, small crystalline imperfections resulting from displacements of the crystal axis can lead to optical inhomogeneity. The result is that the laser beam diverges to such an extent that the device is not useful in certain laser applications.

Also, a solid state host crystal may lack the optical transparency or clarity over a broad spectral band required to effect efficient laser action.

Finally, many solid state crystal host materials require charge compensation necessitating the use of a secondary additive in the powder during the crystal growing operation. Such charge compensation procedures often lead to a tendency for the laser material to color or darken under optical pump illumination, thereby detrimentally affecting, or even preventing laser action.

With the above in mind, it is accordingly a primary object of this invention to provide a new solid state laser device in which many of the foregoing problems are overcome.

More particularly, it is an object to provide a new solid state laser device which does not place stringent requirements on the optical pumping system used with the device.

Another object is to provide a solid state laser device including a host crystal which is hard, rugged, and optically isotropic to the end that the risk of cracking or destruction of the crystal as a consequence of thermal gradients developed in different directions in the crystalline structure is minimized.

Other objects are to provide a new solid state laser host crystal having a high melting point, which is chemically inert, and which is amenable to relatively easy fabrication.

Still another important object is to provide a solid state laser host crystal of extremely high optical transparency or clarity over a broad spectral band to the end that an efficient laser operation is provided.

A further object is to provide an optically isotropic host crystal which will result in a relatively narrow laser beam angle.

A particularly important object is to provide a new solid state laser in which the isomorphic substitution of the laser ion in the crystal lattice of the host crystal can be effected without charge compensation and its resulting problems.

Another object is to provide a new solid state laser for emitting output radiation of frequencies different from frequencies generated in solid state lasers available heretofore.

Briefly, these and other objects and advantages of this invention are attained by providing a host crystal of yttrium oxide containing neodymium ions as the primary additive. The physical properties of the yttrium oxide crystal, such as high melting point, optical transparency over a broad spectral band, lattice symmetry to provide an optically and thermally isotropic structure, and relative stability under intense illumination, enable the various objects to be realized.

A better understanding of the new laser device of this invention will now be had by referring to a detail description of one embodiment thereof in conjunction with the accompanying drawings, in which.

Figure 1:
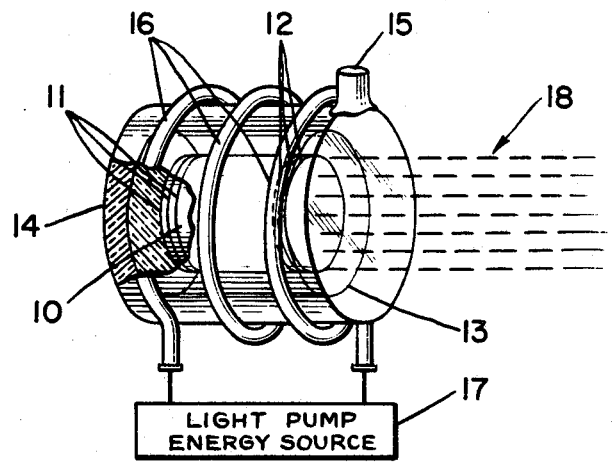
FIGURE 1 is a schematic perspective view of the basic components making up the laser device of this invention.

Referring first to FIGURE 1, the laser crystal is shown at 10 and in accordance with this invention comprises yttrium oxide ($Y_2O_3$) containing neodymium ions ($Nd^{+3}$) as the primary additive. Opposite end surfaces of the host crystal are carefully ground to exact parallel relationship and are provided with regeneration means in the form of dielectric coatings 11 and 12. The dielectric coatings may consist of alternate layers of magnesium fluoride and cerium oxide of quarter wave length thicknesses at a center frequency corresponding to approximately 1.07 microns. The multilayer dielectric coatings are such as to provide high reflectance between wave lengths of 1.06 to 1.09 microns. However, it should be understood that these coatings may be designed to provide high reflectance characteristics over different wave length ranges depending upon the particular fluorescent intensity peaks characteristic of yttrium oxide host and added neodymium ions at which it is desired to effect laser action.

In the partciular example illustrated in FIGURE 1, the laser crystal 10 with the end coatings 11 and 12 is sealed within a Pyrex transparent tube 13 in turn surrounded by a Dewar vessel 14 for providing cooling. Towards this end, liquid nitrogen may be introduced at 15 to hold the crystal at a temperature of substantially 77° K. Optical pumping means is provided in the form of a spiral flash lamp 16 surrounding the Dewar vessel 14 and connected to a suitable energy source 17. The stimulated laser beam passes through the coatings 12 as indicated at 18.

In the embodiment of the laser device illustrated in FIGURE 1, the host crystal of yttrium oxide was grown by the flame fusion method with the neodymium added in the proportion of 1 atom percent of $Nd^{+3}$. In other words, for every atom of neodymium there are 100 atoms of yttrium. However, it is possible to vary the atom percent of the neodymium ion from $\frac{1}{100}$ atom percent to 10 atom percent.

The grown crystal was then fabricated into a generally cylindrical shape with flat parallel ends for coating with the dielectric multilayer coatings 11 and 12 as described.

Figure 2:
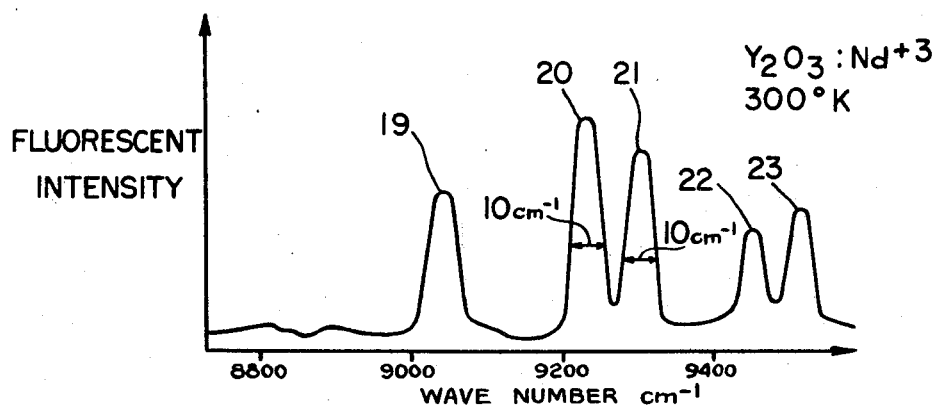
FIGURE 2 illustrates the fluorescent intensity characteristics of the device as a function of wave number over a given spectral band at approximately room temperature; and, FIGURE 3 illustrates the fluorescent characteristics over the same spectral band at a temperature of 77° K.

Referring to FIGURE 2, the fluorescent characteristics of the $Y_2O_3:Nd^{+3}$ at room temperature or approximately 300° K. are shown. The abscissas in FIGURE 2 are expressed in wave numbers which constitute the reciprocals of the wave lengths in inverse centimeters. Therefore, the abscissas are directly proportional to the frequencies of radiation resulting from fluorescence in the crystalline structure. The value of the frequency in cycles per second may be determined by multiplying the wave number by the velocity of light, or approximately $3 \times 10^{10}$ cm./sec.

In FIGURE 2 it will be noted that fluorescent peaks 19, 20 and 21 occur at wave numbers of approximately 9060, 9260, and 9300. Smaller fluorescent peaks 22 and 23 also occur at wave numbers of 9450 and 9500.

The widths at half intensity levels for the peaks 20 and 21 at room temperatures are approximately 10 cm.$^{-1}$ each as indicated.

Figure 3:
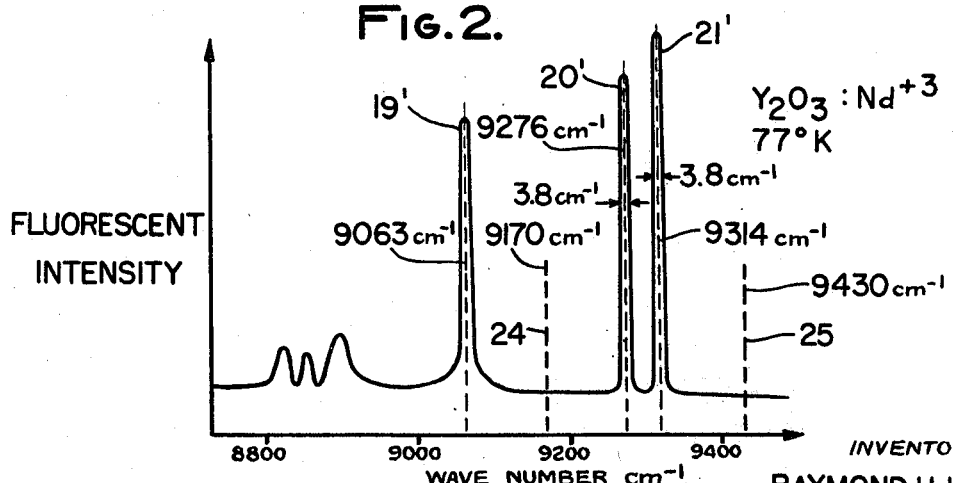

FIGURE 3 shows the fluorescent intensity characteristics of the laser crystal when cooled to a temperature of 77° K. The fluorescent peaks corresponding to 19, 20 and 21 of FIGURE 2 are indicated at 19', 20' and 21' in FIGURE 3. As a consequence of the cooling, the heights of the peaks increased considerably and the width decreased to approximately one-third and the peaks corresponding to the peaks 22 and 23 disappeared. There was also observed a slight upward shift in frequency. The ordinate scale in FIGURE 3 is different from that in FIGURE 2 in order to accommodate the peaks on the drawing.

In FIGURE 3 the spectral band at which high reflectance is provided by the multilayer dielectric coatings 11 and 12 referred to in FIGURE 1 is defined by the vertical dash lines 24 and 25. This high reflectance thus occurs in a band including the maximum intensity peaks 20' and 21' and it is at these peaks that laser action is observed. If the multi-dielectric reflective end coatings were designed to encompass the fluorescent peaks 19' illustrated in FIGURE 3, laser action would undoubtedly be observed at this frequency.

In addition to the fluorescence depicted in FIGURES 2 and 3, neodymium in yttrium oxide fluoresces at wave lengths of approximately 0.885, 0.910, 0.925, 0.942 micron and also at several wave lengths near 1.4 microns. With properly designed end coatings, laser action would be observed at any of these wave lengths.

In the operation of the device of FIGURE 1, the threshold for stimulated emission of the radiation of wave number 9314 cm.$^{-1}$ (1.073 microns corresponding to the fluorescent peak 21' in FIGURE 3) was approximately 260 joules. In other words, the light pump energy source 17 provided 260 joules of energy before stimulated emission took place. At higher input energies, for example approximately 350 joules, the fluorescent line having a wave number of 9276 cm.$^{-1}$ shown at 20' in FIGURE 3 and corresponding to a wave length of 1.078 microns also exhibited stimulated emission. These thresholds, however, are not to be considered as indicative of the laser characteristics of the material since only one particular pumping geometry was used in the embodiment depicted ni FIGURE 1.

The neodymium ions in the yttrium oxide host crystal have a four level energy characteristic. The terminal energy level for the fluorescence in the one micron region contains relatively few of the neodymium ions or stated differently, is of a relatively low population. The fluorescent like time of the major peaks depicted in FIGURE 3 on the other hand, is approximately 260 microseconds thereby providing sufficient time to pump ions into higher energy levels to effect a population inversion without requiring too large a peak power from the spiral flash lamp. In other words, the relatively long fluorescent life time of 260 microseconds permits the pumping intensity to be "spread out" over a relatively longer period than is possible with shorter fluorescent life time materials so that large peak power is not necessary with the result that the risk of "burn out" of the spiral flash lamp is minimized.

The yttrium oxide host crystal itself has cubic symmetry and thus is optically and thermally isotropic resulting in a laser device which is relatively rugged and relatively immune to thermal cracking and the like as might occur with nonisotropic structures. The optical homogeneity resulting from the cubic symmetry results in a relatively narrow beam, as shown at 18 in FIGURE 1. Moreover, the excellent transparent characteristics of the yttrium oxide crystal over a broad spectral band leads to efficient laser operation. Further, the $Y_2O_3$ crystal lattice is such that isomorphic substitution of trivalent rare earth ions such as the $Nd^{+3}$ can be effected without the complications of charge compensation.

Finally, it will be evident from FIGURE 3 that emitted radiation frequencies corresponding to the lines at 20' and 21' are different from frequencies heretofore emitted by solid state lasers.

From the foregoing description, it will be evident that the present invention has provided a new solid state laser device having distinct features and advantages over solid state laser devices fabricated heretofore. While only one particular set-up of the laser device has been shown and described in the accompanying drawings, the laser characteristics of the yttrium oxide host crystal containing neodymium ions is not to be thought of as limited to the particular values set forth.

What is claimed is:

1. A solid state laser device comprising, in combination:
   (a) a host crystal of $Y_2O_3$;
   (b) a dopant including from .01 to 10 atom percent of $Nd^{+3}$ ions at given energy levels;
   (c) regenerative means exhibiting high reflectance at given wave lengths, said regenerative means being
      (1) optically coupled to opposite end portions of said crystal to define an optical resonant cavity therefor,
      (2) stimulated radition being coupled out of said optical cavity through one of said regenerative means; and
   (d) optical pumping means coupled to said crystal for effecting an inverted population state of said $Nd^{+3}$ ions between certain ones of said given energy levels, whereby said stimulated radiation is emitted from said crystal at frequencies corresponding to the energy difference between said certain ones of said given energy levels.

2. A device according to claim 1, including temperature control means for holding the temperatures of said crystal at a given value below the ambient temperature.

3. A device according to claim 1, in which said crystal has end faces, said regeneration means comprising multilayer dielectric coatings on said end faces providing high reflectance at wave lengths corresponding to said frequencies at which stimulated radiation is emitted.

4. A device according to claim 1, in which said host crystal fluorescent peaks at wave lengths of substantially 1.073 microns, 1.078 microns, and 1.103 microns, the fluorescent life time being substantially 260 microseconds, and in which said given energy levels are at least four in number, there being a relatively small $Nd^{+3}$ ion population in the fluorescence terminal level so that the peak power and total energy of pumping to effect an inverted population level between higher energy levels and said fluorescent terminal level is effectively decreased as a consequence of said energy level states and said relatively long fluorescent life time.

5. A device according to claim 1, in which said crystal has flat parallel end faces, said regeneration means comprising multilayer dielectric coatings providing high reflectance at wave lengths between 1.06 and 1.09 microns, said frequencies of emitted radiation including frequencies corresponding to wave lengths of 1.073 microns and 1.078 microns.

6. In a laser system including a regenerative means exhibiting high reflectance at given wave lengths and defining an optical cavity, one of said regenerative means passing stimulated radiation from said cavity, and including an optical pumping means, an improved laser device for said system comprising: a host crysal of $Y_2O_3$ doped with from .01 to 10 atom percent $Nd^{+3}$ ions.

References Cited

UNITED STATES PATENTS 3,229,222   1/1966   Sorokin et al. _____ 331—94.5

OTHER REFERENCES

Snitzer, Optical Maser Action of $Nd^{+3}$ in a Barium Crown Glass. Phys. Rev. Letters, vol. 7, No. 12, Dec. 15, 1961, pp. 444–446.

McClung et al., $R_2$ Line Optical Maser Action in Ruby. J. App. Phys., vol. 33, No. 10 (October 1962), pp. 3139–3140.

Maurer, Operation of $Nd^{+3}$ Glass Optical Maser at 9180 A. Applied Optics, vol. 2, No. 1 (January 1963), pp. 87 and 88.

Mandel, Paramagnetic Resonance of $Yb^{3+}$ in Yttrium Oxide. App. Phys. Letters, vol. 2, No. 10 (May 15, 1963), pp. 197 and 198.

JEWELL H. PEDERSON, Primary Examiner

WILLIAM L. SIKES, Assistant Examiner

U.S. Cl. X.R.

252—301.4